Aug. 25, 1959  E. C. JETT  2,901,094
ARTICLE GUIDING AND POSITIONING MEANS
Filed Aug. 14, 1958
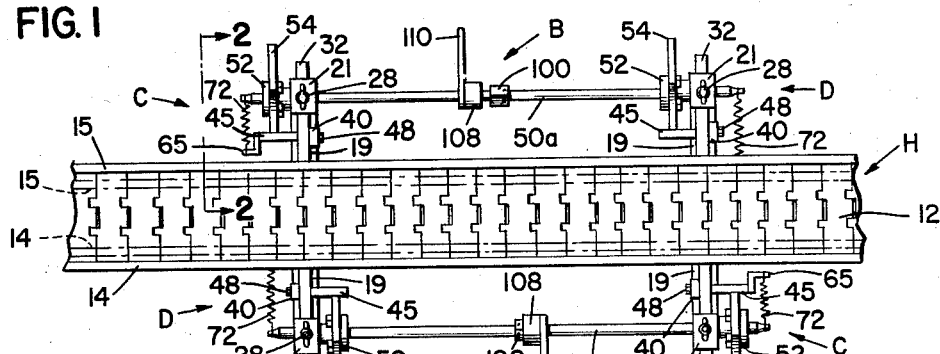
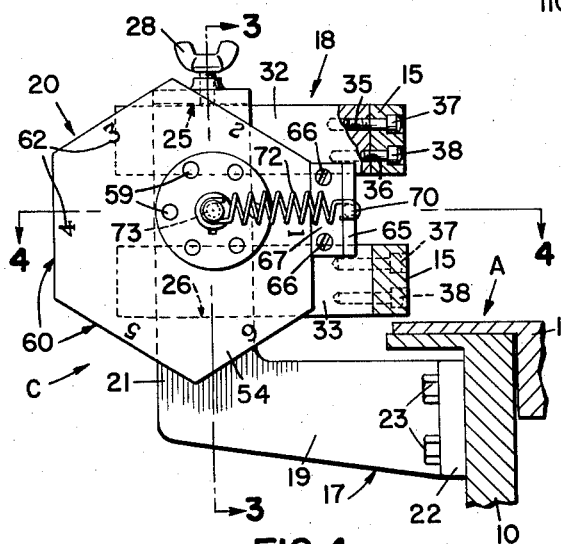
INVENTOR
Edward C. Jett
ATTORNEYS

2,901,094

ARTICLE GUIDING AND POSITIONING MEANS

Edward C. Jett, Coxs Creek, Ky.

Application August 14, 1958, Serial No. 755,059

5 Claims. (Cl. 198—204)

This invention relates to improvements in article guiding and positioning means and more particularly to means for spacing the article guides of conveyors a predetermined distance apart according to the width of the article passing along the conveyor.

The primary object of this invention is the provision of means for quickly changing the spacing between the article guides of a conveyor when the size of the container to be passed along the conveyor is changed, as between runs of different capacity containers along the conveyor.

A further object of this invention is the position of article guiding and positioning means that can be quickly and easily affixed to conventional conveyor guides, eliminating the use of sample article, guide marks, templates, etc., which have heretofore been necessary in order to set the guides at the required distances apart across the conveyor.

A further object is the provision of article guiding and positioning means that can be rapidly operated with a minimum amount of labor time on the part of the operator, providing only a short lapse of time on a production line when a change in the size of material passing along the conveyor belt is made. This is extremely important as in many conveyor operations a change in material handling may occur many times within a working day or shift.

A further object of this invention is the provision of article guiding and positioning means for rapidly positioning the guides of a conveyor utilizing a minimum of working parts, so that the same may be economically manufactured and assembled and there is small likelihood of the device being rendered inoperative due to damaged or disassembled parts.

Other objects and advantages of this invention will be apparent from the following detailed description of the present invention, taken in connection with the accompanying drawing forming a part of this specification, and in which drawing:

Fig. 1 is a fragmentary top plan view of a conveyor showing the attachment thereto of my improved article guiding and positioning means.

Fig. 2 is an enlarged transverse sectional view taken substantially on the line 2—2 of Fig. 1.

Fig. 3 is a vertical sectional view taken substantially on the line 3—3 of Fig. 2.

Fig. 4 is a horizontal sectional view taken substantially on the line 4—4 of Fig. 2, but showing a different form of spring connection than is shown in Fig. 2.

Fig. 5 is a view similar to Fig. 4, but showing still another form of spring connection.

In the drawing, wherein is shown a preferred embodiment of the invention, and wherein similar reference characters designate corresponding parts throughout the several views, the letter A may generally designate the conveyor; B a bank of article guiding and positioning means; C one form of assembly of the article guiding and positioning means; D another form of assembly of the article guiding and positioning means; and E still a third form of assemblage of the article guiding and positioning means.

The conveyor A may be of any conventional construction, including a base 10 which supports an endless conveyor belt 12 and the usual rollers, gears, motor, etc. (not shown), that support and motivate the endless conveyor belt 12. This conveyor belt 12 may likewise be of any conventional form, either made up of a plurality of flexible links as shown in the drawings, or of a continuous flexible nature such as a rubber based endless conveyor belt.

In continuous manufacturing operations, such as may be utilized in the filling, capping and labeling of containers, the conveyor belt 12 receives the container thereupon and passes it through various filling and closing operations, usually conveying the container over quite a distance. It can therefore be readily appreciated that it is necessary to have some form of article guide for maintaining the container in a predetermined position upon the endless conveyor belt 12 and I have therefore provided a pair of article guide rails 14 and 15, supported by a plurality of banks of article guiding and positioning means B to either side of the conveyor belt 12, for guiding the containers therealong. Although I have shown the guide rails 14 and 15 as being of a rectangular cross section it will be readily appreciated that a circular or elliptical guide rail might be utilized and the guides may be of a substantial width, in which case it would be necessary to provide only a single guide rail to either side of the conveyor belt, rather than the pair of guide rails that I have shown.

The banks of article guiding and positioning means B support the guide rails 14 and 15, to either side of the endless belt 12, and are so constructed that they can be moved toward one another, decreasing their spacing transversely of the endless conveyor belt 12, so that when groups of large and small containers are alternatively conveyed along the endless conveyor belt 12 the guide rails can be positioned to securely support the container passing therealong, eliminating any transverse displacement of the container as it travels along the belt and providing a definite aligned path along which the container will travel. It can readily be appreciated that various sized containers will be utilized by any manufacturer in the packaging of his products and it is desirable to provide a container conveying mechanism that can readily be adapted to the size of container or package. It is preferable to provide a bank of article guiding and positioning means B to either side of the conveyor belt, as shown in the drawings, so that the container or package passing along the conveyor will be centered thereupon. However, it is within the scope of my invention to provide a fixed guide rail upon one side of the conveyor belt 12 and to have the other side supported by the article guiding and positioning means B, thus providing a fixed guide rail and a movable guide rail for the guiding of the containers or packages along the conveyor belt 12.

I have discovered that in the normal run of a conveyor belt it is only necessary to provide a single bank of article guiding and positioning means B to either side of the conveyor belt 12, however, it will be readily understood that if the conveyor is exceptionally long that a plurality of banks of article guiding and positioning means B may be disposed to either side of the conveyor belt 12, in order to furnish sufficient support along the entire length of the guide rails. If a plurality of article guiding and positioning means B are provided along each side of the conveyor belt I have found that it is advantageous to provide a segmental guide rail along either side of the conveyor, the segments each being supported by a single bank of article guiding and positioning means B and being spaced apart a short distance intermediate the banks along each side thereof, so that the segmental guide rails may be individually set. This is necessary if a rigid guide rail is utilized, as is preferred, in order to prevent a distortion of the guide rails by the separate movement of a plurality of banks of article guiding and positioning means disposed therealong. Of course, if the guide rails are of a flexible nature then a continuous guide rail might be utilized, however, I have found a rigid guide rail to be most desirable.

As each of the article guiding and positioning means C, D and E are of substantially the same construction, and as each of these units is interconnected into a bank in substantially the same manner, it is believed that this invention will best be understood by first describing each of the units as though it were designed to be operated independently and to then describe the interconnection of these units into a bank.

The article guiding and positioning means C preferably comprises a frame 17, secured to the base 10; slide means 18, which are secured to the guide rails 14 and 15; and cam means 20 which regulates the movement of the slide means 18 with respect to the frame 17.

The frame 17 is preferably of an L-shaped configuration, having a lowermost leg 19 and an upstanding leg 21. The lowermost leg 19 is provided, at one end thereof, with flange projections 22, to each side thereof, which receive the bolts 23 for securely holding the frame 17 upon the base 10. The upstanding leg 21 of the frame 17 is provided with spaced apart apertures 25 and 26 that receive the slide means 18. A threaded opening 27 may be provided at the uppermost portion of the leg 21, leading into the aperture 25, so that a thumb screw 28 may be threaded therethrough into engagement with the slide means 18, locking the same in a fixed position. A bearing opening 30 is provided through the upstanding leg 21 of the frame 17, intermediate the openings 25 and 26, which receives the shaft supporting the cam means 20.

The slide means 18 preferably includes an upper slide shaft 32 and a lower slide shaft 33, each of these slide shafts being provided, at one end thereof, with a pair of threaded openings 35 and 36 that receive the bolts 37 and 38, respectively, which secure the guide rails to the slide shafts. The opposite ends of the slide shafts 32 and 33 extend through the openings 25 and 26, respectively, provided in the upstanding leg 21 of the frame 17 and are mounted for sliding movement therethrough. A clamp bar and spacer 40 is secured between the slide shafts 32 and 33, adjacent the interconnection of these slide shafts with the guide rails 15, supporting the outermost ends of the slide shafts 32 and 33 in a spaced position. This clamp bar and spacer 40 is provided with a central body portion 41 extending intermediate the slide shafts 32 and 33 and is provided with extended flange portions 42 and 43 that extend over one side of the slide shafts 32 and 33. The follower 45, of the cam means 20, which will subsequently be described, is of a height greater than the distance between the slide shafts 32 and 33 and abuts against the sides of slide shafts 32 and 33 opposite the clamp bar and spacer 40. This follower 45 is provided with screw threaded openings 47 that receive the threaded portions of the bolts 48 which extend through the clamp bar and spacer 40, thus securely interconnecting the clamp bar and spacer 40 and the follower 45 to either side of the slide shafts 32 and 33, with the body portion 41 of the clamp bar and spacer 40 extending therebetween, thus securely holding the slide shafts 32 and 33 in a fixed spaced position.

The cam means 20 preferably comprises a cam shaft 50, passing through the bearing opening 30 of the leg 21 and supported by the frame 17. Mounted upon the shaft 50, to one side of the slide means 18, to the same side of the slide shafts 32 and 33 as is the follower 45, is a hub 52 that supports a cam 54. The hub 52 is secured to the cam shaft 50 by means of a key 55 and a set screw 56, as shown in Fig. 3.

The cam 54 is provided with an off-center opening 58 that fits about the hub 52, the cam 54 being secured to the hub 52 by means of the bolts 59. The cam 54 is provided with a plurality of peripheral faces 60, each of the faces of which is spaced at varying distances from the hub receiving opening 58. These various faces 60 of the cam 54 may be provided with indicia 62, the indicia grading the faces of the cam in proportion to their spacing from the central opening 58. It is usually desirable to provide some form of spring means for securely holding the follower 45 in direct abutment with one of the faces 60 of the cam 54, and I have shown various modifications of the mounting of this spring means as follows:

In the form C I have shown the spring means as comprising a bracket 65 attached to the outermost end of the follower 45 by means of the screws 66, the bracket 65 being of an L-shaped configuration, one leg 67 thereof being secured to the one end of the follower 45 by means of the screws 66 and the other leg 68 extending outwardly therefrom and terminating in a reduced portion 70 to which is attached one end of the follower return spring 72. The cam shaft 50 is provided with a groove 73, at one end thereof, which receives the other end of the follower return spring 72. It will thus be seen that no matter what position the cam 54 takes that the follower 45 will always be held in close abutment with one of the faces 60 of the cam 54 by the spring 72.

In the form D I have likewise shown one end of the follower return spring 72 as being secured within the groove 73 at one end of the cam shaft 50, however, I have shown the other end of this follower return spring 72 as being secured to an attaching bracket 75 that is interconnected between the guide rails 15. The attaching bracket 75 is preferably of a width proportional to the spaced apart distance of the guide rails 15 and is secured therebetween by means of the bolts 76. This attaching bracket 75 has a reduced portion 77 at one end thereof to which is secured the other end of the follower return spring 72. In this form of invention the guide rails 15 are continually urged toward the cam 54 and, as the slide shafts 32 and 33 are rigidly secured to the guide rails 15, and as the follower 45 is rigidly secured to the slide shafts 32 and 33, the follower 45 will thereby be continually urged against one of the faces 60 of the cam 54. In this form of the invention of Fig. 4, I have shown a backing screw 78 as being secured through one end of the follower 45, with one end thereof bearing against the attaching bracket 75. This backing screw 78 lends additional support and rigidity to the cam follower 45. While I have shown this backing screw in only this form of the invention, it will be readily understood that the same could be easily utilized in the other forms of the invention, with slight modification.

In the form E of the invention, shown in Fig. 5, I have provided two longer springs for greater slide travel and more uniform return spring effort when the range of guide rail spacing would be large enough to make a short spring or a single spring impractical. Thus, a bracket 80 is secured to the upstanding leg 21 of the supporting frame 17 and forms an attachment for one end of each of the follower return springs 72. This bracket 80 is preferably of an L-shaped configuration, one leg 82 thereof being secured to the upstanding leg 21 of the frame 17 by means of the screw 84, and the other leg 85 having a tapered portion 86 which receives the follower return spring 72. The guide rails 15 are provided with an eye 88 which receives the other end of each of the follower return springs 72. It will be seen that the guide rail 15 is thus continually urged in a direction toward the cam 54, and, as the slide shafts 32 and 33 are rigidly connected to this guide rail, and as the follower 45 is rigidly connected to the slide shafts 32 and 33, the follower 45 will be urged into continuous abutment with one of the faces 60 of the cam shaft 54.

When two or more of the article guiding and positioning means are interconnected into a bank B, as shown in Fig. 1, a single cam shaft 50ª is utilized to support the cams 54. This continuous cam shaft 50ª is provided, intermediate the article guiding and positioning means, with a collar 100 that is secured to the cam shaft 50ª by means of a set screw 101. This collar is provided with a plurality of faces 103, the number of faces provided corresponding to the number of faces on the cam 54. Indicia 105 may be provided upon each of the faces 103 of the collar 100, this indicia 105 corresponding to the number of the indicia 62 provided upon the cam 54. A socket 108 is mounted upon the cam shaft 50ª, the socket 108 defining a collar receiving chamber 109 for interfitting about the collar 100, and having a handle 110 for the turning of the socket 108.

While I have shown a pair of the article guiding and positioning means as comprising a bank B it will be readily understood that more than two of these units may be easily mounted upon a single shaft 50ª. It will likewise be understood that the provision of a collar having the same number of faces as the cam, each being provided with corresponding indicia, is for the purpose of facile operation of the device and that a collar having either a greater or lesser number of faces might be easily provided. I have also shown the bank B as containing two different forms of the invention, however, it will be readily understood that a single form may be utilized throughout the bank, or various forms may be substituted, one for the other.

When the article guiding and positioning means are interconnected in banks, as is shown in Fig. 1, and as is the preferable arrangement, the cams of the bank are arranged so that the corresponding faces thereof abut the follower plate and hold the guide rails in a position parallel to the course of the conveyor belt 12. When it is desired to run a smaller group of containers or packages along the conveyor 12 the turning of the cam shaft 50ª, by means of the socket 108 and collar 100 will present a different cam face in abutment with the follower, thus moving the guide rails into a closer spaced relationship, such as is shown in the dot-and-dash lines in Fig. 1. The side of the container or package being conveyed will, of course, determine the degree of movement necessary to secure the desired spacing of the guide rails 14 and 15.

In the event that it is desired to place the guide rails 14 and 15 in a converging or diverging direction the interconnection of the mounting of the cams upon the cam shaft 50ª may be easily modified. In order to provide non-parallel use of guide rails the distance from cam center to flat face may be different for the cams at the corresponding indicia for a bank. It is possible and practicable that various combinations of cam setting positions may be used to accomplish intermediate distances between guide rails across the conveyor.

The cams can be made in sections to facilitate changes of setting when a new distance from flat to center is required, without requiring a complete new cam.

Various changes may be made to the form, size and shape of the invention herein shown and described, without departing from the spirit of the invention or scope of the following claims.

I claim:

1. In article guiding and positioning means the combination of a frame; slide means movably mounted upon said frame; said slide means including a pair of separate slide shafts, said frame being provided with separate openings for receiving and supporting said separate slide shafts, and a clamp bar and spacer secured to said slide shafts for unitarily supporting said slide shafts in a spaced relation for cooperative movements; an article guide secured to said slide means; cam means rotatably supported by said frame; and a follower secured to said clamp bar and spacer and abutting said cam means, said cam means operatively engaging said follower for movement of said slide means and said article guide with respect to said frame.

2. The combination as specified in claim 1 wherein a bracket is secured to said follower and a follower return spring is secured between said bracket and said cam means, said follower return spring maintaining said follower in abutment with said cam means.

3. The combination as specified in claim 1 wherein said article guide is provided with an attaching bracket and a follower return spring is secured between said attaching bracket and said cam means, said follower return spring maintaining said follower in abutment with said cam means.

4. The combination as specified in claim 1 wherein said frame is provided with a bracket, said article guide means is provided with attaching means, and a follower return spring is secured between said bracket and said attaching means, said follower return spring maintaining said follower in abutment with said cam means.

5. The combination as specified in claim 1 wherein an adjustable backing screw is secured to said follower, the length of said backing screw being adjustable, so that as said cam means is set to a predetermined position one end of said backing screw may be adjusted to abut said article guide, giving additional support and rigidity to said follower.

References Cited in the file of this patent
UNITED STATES PATENTS

| | | |
|---|---|---|
| 848,736 | Glass | Apr. 2, 1907 |
| 2,229,605 | Snyder et al. | Jan. 21, 1941 |